UNITED STATES PATENT OFFICE.

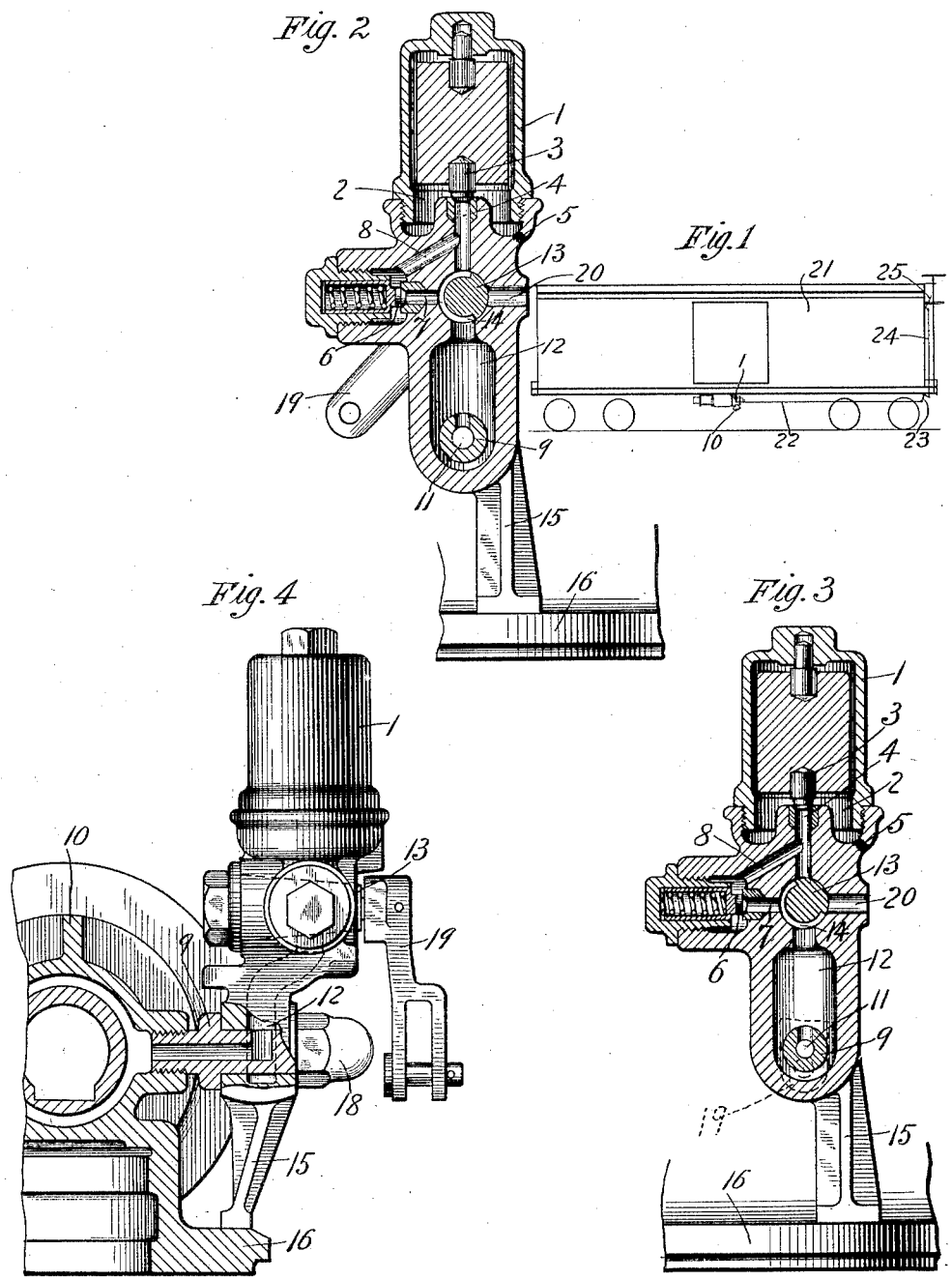

WALTER V. TURNER, OF EDGEWOOD, PENNSYLVANIA, ASSIGNOR TO THE WESTINGHOUSE AIR BRAKE COMPANY, OF PITTSBURGH, PENNSYLVANIA, A CORPORATION OF PENNSYLVANIA.

PRESSURE-RETAINING-VALVE DEVICE.

1,081,347.            Specification of Letters Patent.    Patented Dec. 16, 1913.

Application filed June 14, 1910.  Serial No. 566,771.

*To all whom it may concern:*

Be it known that I, WALTER V. TURNER, a citizen of the United States, residing at Edgewood, in the county of Allegheny and State of Pennsylvania, have invented new and useful Improvements in Pressure-Retaining-Valve Devices, of which the following is a specification.

This invention relates to fluid pressure brakes, and more particularly to a pressure retaining valve device for holding a predetermined degree of pressure in the brake cylinder.

Heretofore, in connection with retaining valves it has been the practice to connect a pipe to the exhaust port of the triple valve and to extend the pipe to the end of the car, where the retaining valve is applied and where a manually operated handle is provided, so that the brakeman may control the connection of the retaining pipe to the atmosphere or to the retaining valve. This construction necessitates the employment of a long retaining pipe and increases the chance of leakage when the retaining valve is cut in.

The principal object of my invention contemplates attaching the retaining valve directly to the triple valve and providing means, which may be extended to a convenient point at the end of the car, for cutting the retaining valve in or out, as desired.

In the accompanying drawing; Figure 1 is a diagrammatic view of a car equipped with a brake cylinder pressure retaining valve device embodying my improvement; Fig. 2 a sectional view of a pressure retaining valve constructed according to my invention, showing the parts in position for retaining one degree of pressure in the brake cylinder; Fig. 3 a similar view, showing the parts in position for retaining another degree of pressure in the brake cylinder; and Fig. 4 an end elevation of the retaining valve, partly in section.

While my improvements may be employed in connection with single pressure and other types of retaining valves, the retaining valve shown for the purpose of illustrating an application of my invention is of the duplex pressure type and comprises a retaining valve casing 1 having a chamber 2 containing a weighted valve 3 for controlling communication from a passage 4 to an exhaust port 5 and a spring pressed valve 6 for controlling communication from a passage 7 to a passage 8, leading to passage 4.

A screw threaded plug 9 is screwed into the exhaust port of the triple valve 10 and fits into the casing 1, as shown in Fig. 4. A passage 11, through the plug 9, forms a communication from the triple valve exhaust port to a chamber 12 in the retaining valve casing 1. The chamber 12 opens to the seat of a manually operated plug cock 13 having a cavity 14.

The casing 1 is provided with a foot 15 adapted to rest on the flange portion 16 of the triple valve 10 when the parts are in position, the parts being assembled by screwing the plug 9 into the triple valve exhaust port, slipping the retaining valve casing 1 onto the plug 9, with the foot 15 resting on the flange 16, and then screwing nut 18 home to tightly clamp the parts together.

In the position of the plug cock operating lever 19 shown in Fig. 2, the cavity 14 connects chamber 12 with passage 4, so that the pressure retained in the brake cylinder in this position corresponds with the load on the valve 3 only. With the lever 19 in the position shown in Fig. 3 the passage 4 is cut off and only the passage 7 is connected by the cavity 14 to the chamber 12. Consequently the load of the valve 6 is added to the load of the valve 3 and the pressure retained in the brake cylinder corresponds with the sum of the loads acting on both valves.

In the third position of the lever 19, not shown, the cavity 14 connects chamber 12 only with the atmospheric exhaust port 20, so that fluid in the brake cylinder is free to flow to the atmosphere in this position.

As shown in Fig. 1, the triple valve 10 may be attached to the car 21 in the usual manner and a rod 22 connected to the lever 19 of the retaining valve extends on the end of the car. The direction of movement may be changed so as to lead up to the desired operating point by providing a bell crank lever 23 adapted to be pivotally mounted on the end sill of the car, a rod 24 being connected to the bell crank lever 23 and extending up to the top of the car where a suitable operating handle 25 is provided.

It will now be seen that the usual brake cylinder pressure retaining pipe is dispensed with and consequent liability to leakage avoided.

Having now described my invention, what I claim as new and desire to secure by Letters Patent, is:—

1. In a fluid pressure brake, the combination with a triple valve device having an exhaust port, of a plug secured in said exhaust port and having a passageway therein and a projecting portion forming a bearing, a pressure retaining valve device mounted on said bearing and including a controlling cock, a passage connecting the cock with the passageway of the plug, and means located at a point distant from the retaining valve device for controlling the same.

2. In a fluid pressure brake, the combination with a triple valve device, of a plug secured in the exhaust port of the triple valve device, a pressure retaining valve device mounted on said plug and provided with a supporting foot, and means adapted to be manually operated from the end of the car for cutting said retaining valve device into and out of service.

3. In a fluid pressure brake, the combination with a triple valve device, of a plug secured in the exhaust port of the triple valve device, a pressure retaining valve device mounted on said plug and provided with a supporting foot adapted to rest on a flange of the triple valve device, and a system of rods and levers for manually controlling said retaining valve device from the end of the car.

In testimony whereof I have hereunto set my hand.

WALTER V. TURNER.

Witnesses:
J. H. EICHER,
A. M. CLEMENTS.

---

Copies of this patent may be obtained for five cents each, by addressing the "Commissioner of Patents, Washington, D. C."